United States Patent [19]
Brady

[11] 3,843,719
[45] Oct. 22, 1974

[54] SYNTHESIS OF ESTERS
[75] Inventor: Donnie G. Brady, Bartlesville, Okla.
[73] Assignee: Phillips Petroleum Company, Bartlesville, Okla.
[22] Filed: Feb. 28, 1972
[21] Appl. No.: 230,037

Related U.S. Application Data
[62] Division of Ser. No. 824,677, May 14, 1969, abandoned.

[52] U.S. Cl............ 260/476 R, 260/410.9 R, 260/410.9 N, 260/468 R, 260/468 I, 260/475 R, 260/475 N, 260/485 R, 260/485 N, 260/486 R, 260/491, 260/493
[51] Int. Cl................ C07c 69/78, C07c 69/80
[58] Field of Search.......... 260/468 R, 475 N, 491, 260/493, 410.9 R, 410.9 N, 475 R, 476 R, 485 R

[56] References Cited
UNITED STATES PATENTS
| | | | |
|---|---|---|---|
| 3,341,575 | 9/1967 | Fierce et al. | 260/491 |
| 3,651,098 | 3/1972 | Heer et al. | 260/485 G |
| 3,655,701 | 4/1972 | Darre | 260/476 R |

*Primary Examiner*—Lorraine A. Weinberger
*Assistant Examiner*—E. Jane Skelly

[57] ABSTRACT

Preparation of esters of carboxylic acids in improved yields in shorter reaction times by use as catalysts organic compounds and complexes of certain Group VA and VIA elements. The method optionally uses a soluble iodide for further increase in yield.

12 Claims, No Drawings

SYNTHESIS OF ESTERS

This application is a divisional of U.S. application Ser. No. 824,677, filed May 14, 1969, now abandoned.

This invention relates to a method for the preparation of esters of carboxylic acids. In one aspect, it relates to catalysts to improve the reactions of alkyl or alkenyl halides with salts of carboxylic and polycarboxylic acids.

Heretofore, it has been recognized that alkyl or alkenyl halides react with alkali metal salts of carboxylic acids at elevated temperature to form the corresponding esters. However, yields in general have been low, conversion rates by the esterification or displacement process have been slow requiring excessive residence times in the reactors. Annoying side reactions frequently occur.

While the reaction of alkyl or alkenyl halides with salts of carboxylic acids has been a general method of esterification in the teaching of organic chemistry, yet commercial success has been limited pending discovery of methods to increase yields with swifter surer reactions with a minimum of side reaction losses. One approach has been to use certain amines and quaternary ammonium halides as catalysts, though with limited effectiveness.

Other methods of esterification often involve multiple steps, or use relatively expensive or difficult to handle reagents such as the acid halides. Most such processes have shortcomings compared to the simplicity and ease of using the reaction of alkyl or alkenyl halides with carboxylic acid salts, if such were substantially improved.

I have discovered that the conversion reaction of an alkali metal hydrocarbon carboxylate or polycarboxylate with an alkyl or alkenyl monohalide can be effectively catalyzed by the use of organic catalysts prepared from certain elements of Group VA and Group VIA of the Periodic Table.

More particularly, I have found my catalyzed esterification reactions to provide improved yields, improved rates of conversion, and reduced side reactions. These results are obtained by the use of one or more catalysts prepared from organic compounds which contain sulfur, selenium, tellurium, phosphorus, arsenic, or antimony. Optionally, according to my invention, these catalysts can be used with certain organic iodides as effective catalyst adjuvants to even further enhance the effectiveness and productivity of the esterification reactions.

Therefore, it is the object of my process and catalysts to provide for improved preparations of esters of hydrocarbon carboxylic acids. It is a further object of my invention to provide efficient methods for increased yields of alkyl or alkenyl esters of hydrocarbon carboxylic acids by the use of organic catalysts prepared from certain elements of Groups VA and VIA of the Periodic Table. It is also an object to provide catalysts effective to improve the yield of esters, improve the conversion of reactants, and reduce side reactions in the reaction of alkyl or alkenyl monohalides with hydrocarbon carboxylic acid salts. An additional object is to provide catalysts and catalyst adjuvants to effectively promote the reactions of hydrocarbon carboxylic and polycarboxylic acid salts with alkyl or alkenyl monohalides in the formation of the corresponding esters.

The conversion, esterification, or displacement reaction to which I refer is a reaction between an alkali metal hydrocarbon carboxylate or polycarboxylate with up to four carboxylate groups and an alkyl or alkenyl monohalide. It can be represented by:

wherein $n$ is the number of carboxylate groups; M is an alkali metal such as lithium, sodium, potassium, rubidium, and cesium; X is a halogen including fluorine, chlorine, and bromine; R is alkyl, aryl, cycloalkyl, or combinations thereof such as aralkyl, alkaryl and the like, having up to 10 carbon atoms per R group and a valence of $n$; R' is an alkyl or alkenyl group having as many as 9 carbon atoms and from 0 to 1 double bond. The carbon bonded to the halogen is bonded to not more than 2 other carbon atoms, i.e., should not be a tertiary carbon atom.

The catalysts of my invention are organic compounds or organic complexes containing certain elements. Specifically, these elements are phosphorus, arsenic, antimony, sulfur, selenium, or tellurium. The particular organic compounds or complexes which are my catalysts bear relationship and similarity to each other, and all are effective in the reactions described. However, because of differences in the valence states of the several elements, it is convenient to classify the general formulas into three groups.

One of my catalyst groups has the general formula $R_2^2Y$ in which Y can be sulfur, selenium, or tellurium. The next group has the general formula $R_3^2Z$ in which the Z can be phosphorus, arsenic, or antimony. The third group of catalysts of my invention can be represented by the general formula $[R_4^2P]_mY'$ where P is phosphorus, and where $m$ is an integer from 1 to 3 which is equal to the valence of Y', and where Y' is one of

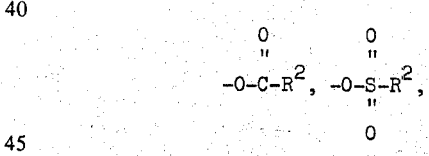

$-F$, $-Cl$, $-Br$, $-CN$, $-OCN$, $-NCO$, $=SO_4$, $-HSO_4$, $\equiv PO_4$, $=HPO_4$, $-H_2PO_4$, $-NO_3$,

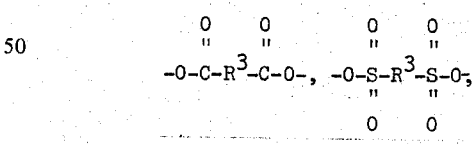

or any other nondeleterious anionic group having a valence of 1 to 3. In each of the catalysts of my invention the symbol $R^2$ is used to designate various hydrocarbyl radicals including alkyl, cycloalkyl, aryl, and combinations thereof such as aralkyl, alkaryl, and the like. The radicals of any given catalyst need not be the same. The symbol $R^3$ is used to designate hydrocarbon radicals like those of $R^2$ in all ways except limiting to a valence of 2 and in a range of 6 to 10 carbon atoms. In general, for effectiveness of the catalyst and solubility requirements the hydrocarbyl radicals should be limited to up to about 8 carbon atoms per radical.

Optionally, according to my invention, a catalyst adjuvant is utilized with the catalyst. This catalyst adjuvant is an iodide compound soluble in the reaction mixture. These compounds can be either organic or inorganic, and where inorganic will be an alkali metal iodide such as lithium, sodium, potassium, rubidium, and cesium iodide. It has also been found that the soluble iodides can include organic iodides such that the organic radical is alkyl, cycloalkyl, arylalkyl, cycloalkylaryl or alkylcycloalkyl having in the range of 1 to 8 carbon atoms wherein the carbon bonded to the iodine is not bonded to more than 2 other carbon atoms, i.e., is not tertiary. It can readily be realized that a wide variety of organic iodides find usefulness as adjuvants to my catalysts.

In general, temperatures in the range of about 50° C. to about 200° C. are employed in the esterification reaction with the catalysts of my invention. Temperatures in the range of about 90° C. to about 180° C. are generally quite effective. Pressures should be sufficient to maintain the reactants and admixtures of the reactants substantially completely in the liquid phase, and will usually be in the range of about 0.5 to 10 atmospheres. Atmospheric pressure is often a convenience and quite suitable. Reaction times sufficient to effect the degree of conversion desired should be employed. Normally, reaction times in the range of about 10 minutes to about 48 hours are satisfactory.

Preferably, the conversion should be effected substantially completely in the absence of water, i.e., under essentially anhydrous conditions to minimize undesirable side reactions. However, minor traces of water in the reactants normally do not interfere unduly.

The equivalent ratio of the alkali metal carboxylate or polycarboxylate to the alkyl or alkenyl monohalide is generally in the range of 0.1:1 to about 10:1, and is preferably from about 0.5:1 to 5:1 for most advantageous operation. Generally, from about 0.1 to 50 moles of catalyst can be employed per 100 moles of the alkali metal carboxylate or polycarboxylate, though preferably in the range of about 0.5 to 10 moles per 100 moles of the carboxylate are employed for optimum efficiency and conversion.

Where a soluble iodide is used as a catalyst adjuvant, the amount will be in the range of 0.1 to 50 moles per 100 moles of carboxylate, more preferably in the range of 0.5 to 10 moles per 100 moles of carboxylate for optimum efficiency. The soluble iodide should have substantial solubility in the reaction medium under reaction conditions of at least 0.1 mole per mole of carboxylate or polycarboxylate.

Upon completion of the desired degree of conversion, the ester produced can be recovered in any conventional manner. Any of the ordinary techniques known to the art such as filtration, stripping, solvent extraction, selective precipitation, and the like can be employed as are necessary or convenient.

The esters produced according to the process of my invention by use of my catalysts are valuable products for wide commerical use such as in lubricating oils, and for subsequent polymerization of esters to the valuable polyesters. Suitable polyesters can be converted into the analogous epoxy compounds and employed with a variety of curing agents to form valuable adhesives, coatings, and the like. Such compositions can also be employed as plasticizers for synthetic resins and for like processes and products.

The process and catalysts of my invention are demonstrated by the following examples. These examples should be considered as illustrative, and not as limiting.

EXAMPLE I

To a stirred reactor was charged a mixture comprised of 20 g (gram) (0.14 mole) of dry sodium benzoate, 10.7 g (0.14 mole) of 2-propenyl chloride, 40 ml of 2-butanone as diluent, 0.5 g (0.005 mole) of diethyl sulfide as catalyst, and 0.3 g (0.002 mole) of sodium iodide as adjuvant. The system was flushed thoroughly with nitrogen and maintained under a nitrogen atmosphere. The admixture was heated to 110° C. over a 30 minute period, and the temperature was maintained at 110° C. for 2.5 additional hours. The admixture was subsequently cooled to room temperature and filtered. The precipitate was washed with additional 2-butanone, the washings being combined with the filtrate. The combination of filtrate and wash solution was stripped to yield 6.5 g of 2-propenyl benzoate, which constituted a 29 per cent yield. The product was determined to be pure 2-propenyl benzoate by an infrared comparison of the product with a known sample of pure 2-propenyl benzoate.

This example demonstrates the synthesis of an alkenyl hydrocarbon carboxylate in effective yield in a short reaction time according to the process of my invention using a catalyst of the general formula $R_2{}^2Y$, here diethyl sulfide, as my catalyst and sodium iodide as my catalyst adjuvant.

EXAMPLE II

With the only exceptions being that neither catalyst nor catalyst adjuvant was employed, a second run was made exactly as in Example I. Upon workup as in Example I, less than 0.5 g of product was recovered, which was not identified.

This control run demonstrates that the catalysts of my invention are necessary for satisfactory results. Attempted esterification, and failure, using a catalyst adjuvant but no catalyst is illustrated as Control Run 5 in the following Example III.

EXAMPLE III

To a stirred reactor in each of a series of runs was charged 21 g (0.1 moles) of dry powdered disodium isophthalate. A solution comprised of 2-propenyl chloride (15.3 g, 0.2 moles) and other materials (as recorded in Table I for each run) in 30 ml of methyl ethyl ketone was added to the reactor of each run. Each system was flushed thoroughly with dry nitrogen, sealed under a nitrogen atmosphere, and heated to 110° C. for 2.5 hours. Each reactor was then cooled to room temperature, and each mixture was filtered. Each filtrate was stripped to recover the yields of di-2-propenyl isophthalate as are noted in Table I. Each product was identified to be di-2-propenyl isophthalate by infrared analysis.

Run 3 demonstrates the preparation of a dialkenyl hydrocarbon dicarboxylate according to the process of my invention using a catalyst of the general formula $R_3{}^2Z$, here a trisubstituted phosphine, as my catalyst, with a catalyst adjuvant, and illustrates high yield in a short reaction time. Run 4 was similar to Run 3, except omitting the catalyst adjuvant and demonstrating the good yield with my catalyst alone. Comparison of Run

Table I

| Run No. | Catalyst | Amount Grams | Catalyst Adjuvant | Amount Grams | Yield Grams | Per cent of Theoretical |
|---|---|---|---|---|---|---|
| 3 | Triphenylphosphine | 0.52 | NaI | 0.20 | 23 | 94 |
| 4 | Triphenylphosphine | 0.53 | None | — | 19.3 | 80 |
| 5 | None | — | NaI | 0.30 | 0.5 | 2 |
| 6 | None | — | None | — | 0.5 | 2 |

3 with Run 4 clearly demonstrates the enhancing effect on yield of the catalyst adjuvant.

Control Run 5 demonstrates that a catalyst of my invention is necessary for satisfactory results, and that a catalyst adjuvant alone is quite inadequate. Control Run 6 further demonstrates that a catalyst of my invention is essential to this process of esterification to provide adequate yields in a reasonable time.

EXAMPLE IV

To a stirred reactor in each of a series of runs was charged 20 g (0.14 moles) of sodium benzoate (17.4 g, 0.12 moles in Run 8). A solution comprised of 11 g (0.14 mole) of n-propyl chloride (9.5 g, 0.12 moles in Run 8) and other materials as noted in Table II in 50 ml of 2-butanone was added to the reactor in each run. Each system was flushed thoroughly with dry nitrogen, sealed under a nitrogen atmosphere, heated to about 150° C. over a period of about 45 minutes, and maintained at about 150° C. for about 3 hours additional (4 hours additional in Control Run 10). Each reaction mixture was cooled to room temperature, and each mixture was filtered. Each filtrate was stripped to recover yields of n-propyl benzoate as are noted in Table II. Each product was identified to be n-propyl benzoate by infrared analysis.

Table II

| Run No. | Catalyst | Amount Grams | Catalyst Adjuvant | Amount Grams | Yield Grams | Per cent of Theoretical |
|---|---|---|---|---|---|---|
| 7 | Triphenylphosphine | 0.8 | NaI | 0.3 | 20.1 | 88 |
| 8 | Triphenylphosphine | 0.8 | None | — | 18.3 | 93 |
| 9 | Triethylamine | 0.3 | None | — | 6.5 | 28 |
| 10 | None | — | None | — | None | — |

Run 7 of this example demonstrates the synthesis of an alkyl hydrocarbon carboxylate according to the process of my invention wherein a catalyst adjuvant is employed concurrently with a trisubstituted phosphine as my catalyst. Run 8 of this example demonstrates the synthesis of an alkyl hydrocarbon carboxylate wherein was used a trisubstituted phosphine as my catalyst, but no catalyst adjuvant. Control Run 9 utilizes a trialkyl amine as a catalyst of the prior art to demonstrate the low conversions effected by such prior catalysts for comparison with the highly increased yields effected by the catalysts and process of my invention. Control Run 10 demonstates that the reaction fails to occur when no catalyst is included.

EXAMPLE V

To a stirred reactor were charged 20 g of sodium benzoate and a solution composed of 17.2 g of isopropyl bromide and 0.80 g of triphenylphosphine in 50 ml of methyl ethyl ketone. The system was flushed with dry nitrogen, sealed, heated to about 150° C. over a period of about 45 minutes, and then maintained at 150° C. for 3 additional hours. Upon cooling to room temperature, the reactor contents were filtered, and the filtrate was stripped to recover 22 g of a mixture comprised of 93 weight per cent isopropyl benzoate and 7 weight per cent methyl ethyl ketone for a yield of 89 per cent.

This example demonstrates the synthesis of another alkyl hydrocarbon carboxylate according to the process of and with a catalyst of my invention.

Examples are given in the following paragraphs of the organic catalysts indicated by general formulas given previously. Such examples should not be considered limiting in any way but only illustrative of the compound types effective as catalysts according to this invention.

Some examples of alkali metal hydrocarbon carboxylates and polycarboxylates which can be employed according to the process of my invention include:
sodium benzoate,
disodium isophthalate,
potassium formate,
lithium acetate,
rubidium decanoate,
cesium 3-methyloctanoate,
potassium cyclopentanecarboxylate,
potassium cyclooctanecarboxylate,
potassium 3-phenylpropionate,
sodium 4-toluenecarboxylate,
lithium 3,5-xylenecarboxylate,
lithium 2-cyclopentaneacetate,
sodium 4-cyclopentanebutanoate,
rubidium 3-ethylcyclohexanecarboxylate,
cesium 2-methylcyclopentanecarboxylate,
disodium terephthalate,
dipotassium phthalate,
tripotassium 1,2,3-benzenetricarboxylate,
trisodium 1,2,4-benzenetricarboxylate,
trilithium 1,2,4-benzenetricarboxylate,
tripotassium 1,3,5-benzenetricarboxylate,
tetrapotassium 1,2,3,4-benzenetetracarboxylate,
tetrasodium 1,2,4,5-benzenetetracarboxylate,
tetrapotassium 1,2,3,5-benzenetetracarboxylate,
disodium 1,8-octanedicarboxylate,
trisodium 1,3,6-hexanetricarboxylate,
disodium 1,4-cyclohexanetricarboxylate,
tripotassium 1,3,6-cyclohexanetricarboxylate,
tetrasodium 1,2,7,8-octanetetracarboxylate,
tetrasodium 1,2,4,5-cyclooctanetetracarboxylate,
and the like.

Some examples of the alkyl and alkenyl monohalides which can be employed according to the process of my invention include:
2-propenyl chloride,
propyl chloride,
2-propyl bromide,
2-chloroethane,
methyl chloride,
methyl bromide,
methyl fluoride,
octyl bromide,
2-ethylhexyl fluoride,
3-fluoro-1-nonene,
4-bromo-3-propyl-1-hexene,
2-chloromethyl-1-octene,
2-bromoethyl-2-propyl-1-pentene,
1-chloro-2-nonene,
1-bromo-3-propyl-2-hexene,
1-bromo-2,3,4-trimethyl-3-hexene,
5-chloro-2,3,4-trimethyl-2-hexene,
4-chloromethyl-4-octene,
6-bromo-4-nonene,
and the like.

Examples of catalysts represented by the general formula $R_2^2Y$, the sulfides, selenides, and tellurides, include:
dimethyl sulfide,
diethyl sulfide,
dioctyl sulfide,
di(2-methylheptyl) sulfide,
dicyclopentyl sulfide,
dicyclooctyl sulfide,
diphenyl sulfide,
dibenzyl sulfide,
di(3,5-dimethylphenyl) sulfide,
di(4-tolyl) sulfide,
di(2-cyclohexylethyl) sulfide,
dicyclopentylmethyl sulfide,
di(3-ethylcyclohexyl) sulfide,
di(2-methylcyclopentyl) sulfide,
dimethyl selenide,
diethyl selenide,
dioctyl selenide,
di(2-methylheptyl) selenide,
dicyclopentyl selenide,
dicyclooctyl selenide,
diphenyl selenide,
dibenzyl selenide,
di(3,5-dimethylphenyl) selenide,
di(4-tolyl) selenide,
di(2-cyclohexylethyl) selenide,
di(cyclopentylmethyl) selenide,
di(3-ethylcyclohexyl) selenide,
di(2-methylcyclopentyl) selenide,
dimethyl telluride,
diethyl telluride,
dioctyl telluride,
di(2-methylheptyl) telluride,
dicyclopentyl telluride,
dicyclooctyl telluride,
diphenyl telluride,
dibenzyl telluride,
di(3,5-dimethylphenyl) telluride,
di(4-tolyl) telluride,
di(2-cyclohexylethyl) telluride,
dicyclopentylmethyl telluride,
di(3-ethylcyclohexyl) telluride, and
di(2-methylcyclopentyl) telluride.

The $R^2$ groups in any particular catalyst need not be the same.

Examples of the catalyst type $R_3^2Y'$ where $Y'$ can be phosphorus, arsenic, or antimony, include the organic compounds classified as phosphines, arsines, and stibenes. It should be recognized that it is unnecessary for the $R^2$ groups to be the same, so that dimethylethylphosphine, or diphenylethylphosphine, and similar compounds are encompassed by the catalysts of my invention.

Some examples of suitable phosphines include:
trimethylphosphine,
triethylphosphine,
trioctylphosphine,
tri(2-methylheptyl)phosphine,
tricyclopentylphosphine,
tricyclooctylphosphine,
triphenylphosphine,
tribenzylphosphine,
tri(3,5-dimethylphenyl)phosphine,
tri(4-tolyl)phosphine,
tri(2-cyclohexylethyl)phosphine,
tricyclopentylmethylphosphine,
tri(3-ethylcyclohexyl)phosphine,
tri(2-methylcyclopentyl)phosphine,
dimethylethylphosphine,
butyl ethylmethylphosphine,
butylcyclohexylphenylphosphine,
diphenylethylphosphine,
diethylphenylphosphine,
dicyclohexylethylphosphine,
and the like.

Some examples of the suitable equivalent arsines include:
trimethylarsine,
triethylarsine,
trioctylarsine,
tri(2-methylheptyl)arsine,
tricyclopentylarsine,
tricyclooctylarsine,
triphenylarsine,
tribenzylarsine,
tri(3,5-dimethylphenyl)arsine,
tri(4-tolyl)arsine,
tri(2-cyclohexylethyl)arsine, tribenzylarsine, tri(3,5-dimethylphenyl)arsine, tri(4-tolyl)arsine, tri(2-cyclohexylethyl)arsine, tricyclopentylmethylarsine,
tri(3-ethylcyclohexyl)arsine,
tri(2-methylcyclopentyl)arsine,
dimethylethylarsine,
butyl ethylmethylarsine,
butylcyclohexylphenylarsine,
diphenylethylarsine,
diethylphenylarsine,
dicyclohexylethylarsine,
and the like.

Some examples of the suitable equivalent stibenes include:
trimethylstibene,
triethylstibene,
trioctylstibene,
tri(2-methylheptyl)stibene,
tricyclopentylstibene,
tricyclooctylstibene,
triphenylstibene, tribenzylstibene,
tri(3,5-dimethylphenyl)stibene,
tri(4-tolyl)stibene,
tri(2-cyclohexylethyl)stibene,
tricyclopentylmethylstibene,
tri(3-ethylcyclohexyl)stibene,
tri(2-methylcyclopentyl)stibene,
dimethylethylstibene,
butyl ethylmethylstibene,
butylcyclohexylphenylstibene,
diphenylethylstibene,
diethylphenylstibene,
dicyclohexylethylstibene,
and the like.

Examples represented by the catalyst type $[R_4{}^2P]_mY'$, compositions known as quaternary phosphonium salts, include:
ethyltriphenylphosphonium benzoate,
tetramethylphosphonium formate,
tetraethylphosphonium acetate,
tetraoctylphosphonium octanoate,
tetra(2-methylheptyl)phosphonium cyclooctanecarboxylate,
tetracyclopentylphosphonium cyclopentanecarboxylate,
tetracyclooctylphosphonium butanoate,
tetraphenylphosphonium hexanoate,
tetrabenzylphosphonium benzoate,
tetra(3,5-dimethylphenyl)phosphonium 3,5-dimethylbenzenecarboxylate,
tetra(4-tolyl)phosphonium 4-toluenecarboxylate,
tetra(2-cyclohexylethyl)phosphonium 2-cyclohexylacetate,
tetracyclopentylmethylphosphonium 2-ethylcyclohexanecarboxylate,
tetra(3-ethylcyclohexyl)phosphonium benzoate,
tetra(2-methylcyclopentyl)phosphonium benzoate,
dimethyldiphenylphosphonium benzoate,
phenyltrimethylphosphonium formate,
benzylethylmethylphenylphosphonium benzoate,
tetrabenzylphosphonium benzoate,
tetraphenylphosphonium benzoate,
ethyltriphenylphosphonium chloride,
tetramethylphosphonium fluoride,
tetraoctylphosphonium bromide,
tetra(2-methylheptyl)phosphonium cyanide,
tetracyclopentylphosphonium cyanate,
tetracyclooctylphosphonium isocyanate,
tetraphenylphosphonium sulfate,
tetrabenzylphosphonium hydrogen sulfate,
tetrabenzylphosphonium phosphate,
tetra(3,5-dimethylphenyl)phosphonium hydrogen phosphate,
tetra(4-tolyl)phosphonium dihydrogen phosphate,
tetra(2-cyclopentylethyl)phosphonium nitrate,
di(tetracyclopentylmethylphosphonium) terephthalate,
di[tetra(3-ethylcyclohexyl)phosphonium] 1,4-benzenedisulfonate,
di[tetra(2-methylcyclopentyl)phosphonium] 1,4-cyclohexanedisulfonate,
di(methyldiphenylphosphonium) 1,10-decanedicarboxylate,
di(phenyltrimethylphosphonium) 1,6-hexanedisulfonate,
benzylethylmethylphenylphosphonium benzenesulfonate,
tetrabenzylphosphonium octanesulfonate,
tetraphenylphosphonium methanesulfonate,
tetrabenzylphosphonium cyclopentanesulfonate,
tetrabenzylphosphonium cyclooctanesulfonate,
tetramethylphosphonium methanesulfonate,
and the like.

Illustrative examples of the soluble iodides as catalyst adjuvants in my invention include:
lithium iodide,
sodium iodide,
potassium iodide,
rubidium iodide,
cesium iodide,
methyl iodide,
ethyl iodide,
octyl iodide,
butyl iodide,
2-methylheptyl iodide,
cyclopentyl iodide,
cyclooctyl iodide,
benzyl iodide,
3,5-dimethylphenyl iodide,
2-cyclohexylethyl iodide,
cyclopentylmethyl iodide,
3-ethylcyclohexyl iodide,
2-methylcyclopentyl iodide,
and the like.

It frequently has been found preferable for the reactions to be effected in the presence of a gas which is substantially completely nonreactive in the reaction environment. Such gases as nitrogen, helium, neon, argon, krypton, ethane, and the like can be employed.

The conversion or esterification reactions usually are effected in the absence of added diluents, though where desired for various purposes, reaction diluents can be employed in amounts which can comprise as much as 95 per cent by weight of the reaction medium. Examples of materials which can be suitably employed as diluents include, acetone, methyl ethyl ketone, methyl isobutyl ketone, tetrahydropyran, cyclohexanone, benzene, hexane, toluene, tetrahydrofuran, cyclododecanone, and the like.

Reasonable variations and modifications are possible within the scope of this disclosure without departing from the scope and spirit thereof.

That which is claimed is:

1. A process for preparing esters of hydrocarbon carboxylic acids which comprises reacting an alkali metal hydrocarbon carboxylate with at least one monohalide selected from alkyl monohalide and alkenyl monohalides wherein said alkyl and alkenyl radicals contain up to 9 carbon atoms and the alkenyl radical 1 double bond, and said halide is fluorine, chlorine, or bromine, under esterification conditions in the presence of an effective amount of a catalyst which comprises compounds of the formula $R_2{}^2Y$ wherein Y is sulfur, selenium, or tellurium, and wherein $R^2$ is a hydrocarbyl radical containing up to 8 carbon atoms and is alkyl, cycloalkyl, aryl, aralkyl, or alkaryl, and a soluble iodide catalyst adjuvant which is at least one of (I) an alkali metal iodide or (II) $R^2I$ other than aryl iodides and tertiary iodides wherein $R^2$ is as defined above, said catalyst adjuvant having a solubility of at least 0.1 mole per mole of said carboxylate and being present in an amount of about 0.1 to about 50 moles per 100 moles of said carboxylate.

2. The process according to claim 1 wherein said carboxylate contains up to 4 carboxylate groups, said alkali metal is lithium, sodium, potassium, rubidium, or cesium, and the hydrocarbon radical of said carboxylate contains up to 10 carbon atoms.

3. The process according to claim 1 wherein said catalyst is a hydrocarbyl sulfide.

4. The process of claim 3 wherein the ratio of said carboxylate to said halide is about 0.1:1 to about 10:1, and the amount of said catalyst is about 0.1 to about 50 moles per 100 moles of said carboxylate.

5. The process of claim 4 wherein said reaction is conducted at a temperature of about 50° C. to about 200° C., at a pressure of about 0.5 to about 10 atmospheres, and during a time of about 10 minutes to about 48 hours.

6. The process of claim 5 wherein said temperature is from about 90° C. to about 180° C., and said pressure is substantially atmospheric.

7. The process of claim 1 wherein said reaction is conducted in the presence of a gas substantially nonreactive to the reactants and said gas is nitrogen, helium, neon, argon, krypton, xenon, saturated hydrocarbons of from 1 to about 6 carbon atoms, or mixtures thereof.

8. The process of claim 1 wherein said reaction is conducted in the presence of a reaction diluent in an amount up to about 95 per cent by weight of the total weight of reactants and said reaction diluent is acetone, methyl ethyl ketone, methyl isobutyl ketone, tetrahydropyran, cyclohexanone, benzene, hexane, toluene, tetrahydrofuran, cyclododecanone, or mixtures thereof.

9. The process of claim 3 wherein said carboxylate is a benzoate, said halide is n-propyl chloride, and said ester is n-propyl benzoate.

10. The process of claim 3 wherein said halide is isopropyl bromide and said ester is isopropyl benzoate.

11. The process of claim 3 wherein said carboxylate is sodium benzoate, said halide is 2-propenyl chloride, said catalyst is diethyl sulfide, and said ester is 2-propenyl benzoate.

12. The process according to claim 1 wherein said at least one monohalide is said alkyl monohalide.

* * * * *